May 23, 1950

C. A. VOGELSANG 2,509,048

TEMPERATURE RESPONSIVE MEASURING APPARATUS

Filed Oct. 13, 1944

INVENTOR.
CHARLES A. VOGELSANG

BY
*C. B. Spangenberg*
ATTORNEY.

Patented May 23, 1950

2,509,048

UNITED STATES PATENT OFFICE 2,509,048

TEMPERATURE RESPONSIVE MEASURING APPARATUS

Charles A. Vogelsang, Erdenheim, Pa., assignor, by mesne assignments, to Minneapolis-Honeywell Regulator Company, Minneapolis, Minn., a corporation of Delaware Application October 13, 1944, Serial No. 558,583

3 Claims. (Cl. 73—341)

The present invention relates to potentiometric measuring apparatus including simple and effective means for effecting its adjustment into different operative conditions in which it is adapted to measure the voltages of different thermocouples in such manner as to effect a scale suppression difference between the measurements of the different thermocouples.

The present invention comprises improvements in apparatus of the above character disclosed in the prior application of Edgar M. Smith, Serial No. 490,589, filed June 12, 1943, and in the Patent No. 2,364,923 granted December 12, 1944 on said prior application. The apparatus illustrated and described in said prior application comprises a self-balancing potentiometric unit including a pen carriage or other exhibiting element deflecting in accordance with the values of the quantities measured. Such a unit may be termed a multiple range potentiometer, as the relation between the deflective position of the exhibiting element and the value of the quantity measured is different in different range adjustments of the unit. The term "scale suppression" is used herein, and in said prior application, with a meaning well known to the art.

The general object of the present invention is to provide potentiometric measuring apparatus of the general character disclosed in the above mentioned patent, with improved means for recalibrating or standardizing the potentiometric measuring circuit as required to compensate for variations in the voltage of the energizing battery of the circuit, when said circuit includes resistors having different temperature coefficients and is adapted to provide automatic cold junction temperature compensation for each thermocouple.

The various features of novelty which characterize my invention are pointed out with particularity in the claims annexed to and forming a part of this specification. For a better understanding of the invention, however, its advantages and specific objects attained by its use, reference should be had to the accompanying drawings and descriptive matter in which I have illustrated and described preferred embodiments of the invention.

Figure 1:
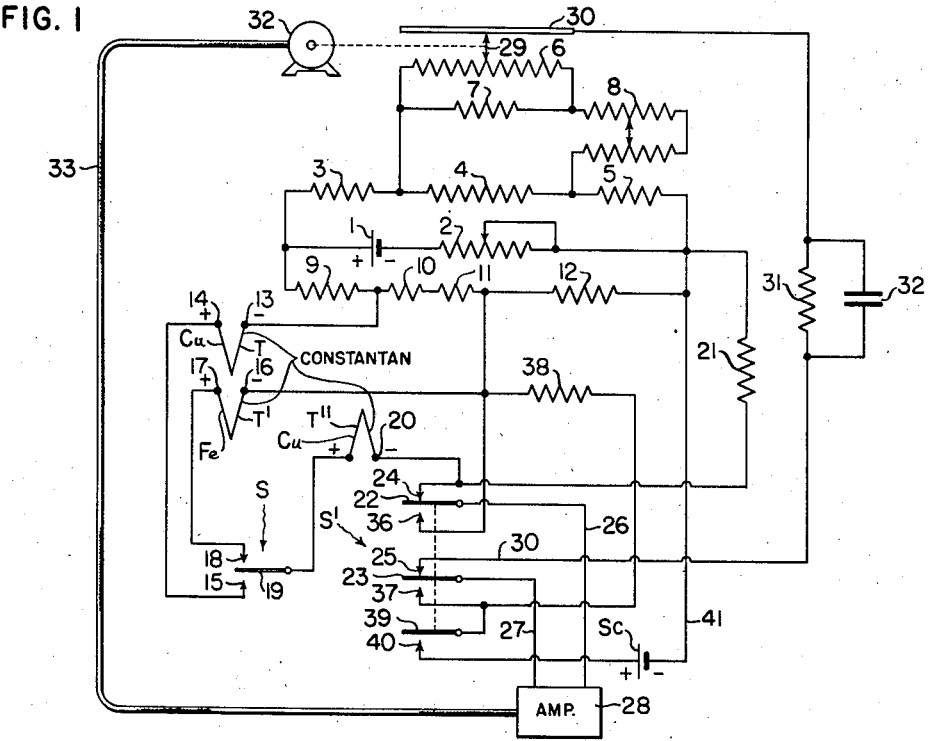
Figure 2:
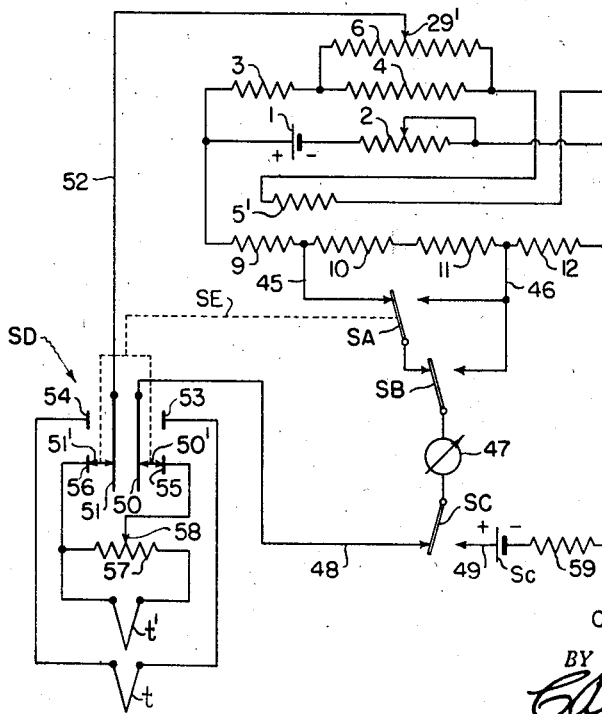

Of the drawings:

Fig. 1 is a diagram illustrating a potentiometric measuring circuit network; and Fig. 2 is a diagram illustrating a modification of the circuit network shown in Fig. 1.

The potentiometric measuring circuit network shown diagrammatically in Fig. 1, includes a split potentiometer or bridge, a measuring branch and a calibrating branch. The split potentiometer comprises an energizing branch, a slide wire resistance branch and a second resistance branch, the two resistance branches being connected in parallel with each other and in series with the energizing branch. The energizing branch includes a circuit energizing source of current 1 and an adjustable resistance 2. The slide wire resistance branch, in the form shown, comprises resistors 3, 4 and 5 connected in series with one another, and a slide wire resistance 6 and a resistance 7 connected in parallel with one another and in series with an adjustable resistance 8 to form a shunt about the resistance 4. The second resistance branch comprises resistors 9, 10, 11 and 12 connected in series with one another. For cold junction temperature compensating purposes the resistors 9 and 10 may be formed of copper or other metal having a positive temperature coefficient while the resistors 11 and 12 may be formed of a metal such as manganin, the resistance of which changes little, or not at all, with changes in temperature.

A thermocouple T, the hot junction temperature of which is to be measured, has one terminal 13 connected to the third branch of the bridge circuit at the junction of the resistors 9 and 10 and has its second terminal 14 connected to the contact 15 of a selector switch S. A second thermocouple T', the hot junction temperature of which is to be measured, has one terminal 16, connected to the third branch of the potentiometer bridge at the junction of the resistors 11 and 12, and has its second terminal 17 connected to a contact 18 of the switch S. The switch S comprises a switch blade 19 adjustable between one position in which it engages contact 15 and is out of engagement with contact 18, and a second position in which it engages contact 18 and is out of engagement wtih contact 15. The switch blade 19 is connected to one terminal of a thermocouple T'' employed for cold junction temperature compensating purposes and having its second terminal 20 connected through a resistance 21 to the negative terminal of the resistor 12.

A calibration or standardizing switch S' serves when its switch blades 22 and 23 are in engagement with contacts 24 and 25, respectively, to establish the measuring branch of the circuit network, by connecting the terminals 26 and 27 of a current responsive device 28 between the terminal 20 of the thermocouple T'' and the slider contact 29 in contact with the slide wire resistance 6.

The contact 24 is connected to the terminal 20 of the thermocouple T", and through the latter is connected to the potentiometer bridge circuit either at the junction of the resistors 9 and 10 through the thermocouple T and its terminals 13 and 14, in one adjustment of the switch S, or at the junction of the potentiometer bridge circuit resistors 11 and 12 through the thermocouple T' and its terminals 16 and 17 in a second adjustment of the switch S. The contact 25 is connected to a conductor 30 including a portion alongside the slide wire resistor 6 and connected to the latter by the slider contact 29 at a point along the length of the resistance 6 which depends on the adjustment of said contact. To minimize the risk of over-shooting and consequent hunting in the adjustment of the contact 29, effected as hereinafter described, a resistance 31 and a condenser 32 in shunt to said resistance are advantageously included in the connection between the contact 25 and the portion of conductor 30 engaged by contact 29. The resistor 31 and condenser 32 operate to effect their intended purpose in a known manner, fully disclosed in the Harrison and Wills Patent 2,300,742, granted November 3, 1942, and hence need not be further described or referred to herein.

As shown, the contact 29 is adjusted by a reversible electric motor 32, operatively connected through a cable 33 to the output circuit of the current responsive device 28. The device 28 is, advantageously, a so-called conversion amplifier, of known type and form, now in commercial use and illustrated and described in the pending application for patent of Walter P. Wills, Serial No. 421,173, filed December 1, 1941, now Patent No. 2,423,540, granted July 8, 1947, on said pending application.

Said conversion amplifier includes means for transforming a small D. C. current into a pulsating current of one phase or the opposite phase depending on the direction of the D. C. current and comprising electronic means for amplifying said pulsating current and producing an alternating current which can be utilized in operating a reversible control motor such as the motor 32 in selective accordance with the direction and magnitude of said small D. C. current. The device 28 has its input terminals 26 and 27 connected to the switch blades 22 and 23, respectively.

The recalibration branch of the circuit network shown in Fig. 1, comprises contacts 36 and 37 of the calibration switch S'. The contact 36 is connected directly, and the contact 37 is connected through resistance 38, to the thermocouple terminal 16 and thereby to the junction of the resistors 11 and 12 in the third branch of the potentiometer bridge circuit. The contact 37 is also connected to a third switch blade element 39 of the standardizing switch S'.

As indicated by the dotted line, the switch blades 22, 23 and 39 of the switch S' are connected for simultaneous adjustment between upper and lower positions. The upper position of the switch blade 39 is in idle position, but in its lower or standardizing position, the switch blade 39 engages a switch contact 40 which is connected to the positive terminal of a standard cell Sc. The latter has its negative terminal 41 connected to the negative terminal of the resistor 12. Through the contact 40, switch blade 39, resistance 38 and the conductor connecting resistance 38 to the connected terminals of resistors 11 and 12, the positive terminal of the standard cell Sc is connected to the positive terminal of the resistor 12. In the standardizing condition of the switch $S^1$, the terminals 26 and 27 of the current responsive device 28 are connected through switch blades 22 and 23 and contacts 36 and 37 to the opposite ends of the resistance 38.

In consequence, with the switch S' in its standardizing adjustment, current will flow through resistor 38 unless the potential drop in the resistor 12 is equal in magnitude and opposite in direction to the E. M. F. of the standard cell Sc. If current flows through the resistance 38, the current responsive device 28 will set the motor 32 into operation and thereby indicate that adjustment of the variable resistance 2 is needed to enable the battery 1 to impress the proper voltage on the terminals of the two resistance branches of the split potentiometer bridge circuit. An adjustment of the resistance 2 may then be effected manually. When the proper adjustment of the resistance 2 is made that fact is indicated by the stoppage of the motor 32 with the slider contact 29 at some intermediate point in its range of movement, the location of that intermediate point being without significance.

In the arrangement shown in Fig. 1, the thermocouple T" is adapted to serve as the cold junction of each of the thermocouples T and T" when it is connected into the measuring circuit. Preferably, the thermocouple T" is located in proximity to the resistors 9 and 10 so as to be subjected to substantially the same ambient temperature conditions. With the thermocouples T and T" both copper constantan thermocouples, and with their positive terminals connected by the switch blade 19 and a contact 15 of the switch S, no E. M. F. is created at the terminals of that switch because the switch terminal connections are then copper to copper. When the blade 19 of the switch S is in its upper position in which it engages the contact 18, the copper terminal of the thermocouple T" is connected to the iron terminal of the iron constantan thermocouple T', and the terminals of the switch S then constitute an iron copper thermocouple. Such a thermocouple has a very low E. M. F., and moreover, the temperature of the terminals of the switch S is near, usually within a degree or so, to the temperature of the cold junction thermocouple T". Consequently, the thermocouple comprising the terminals of the switch S produces a negligibly small E. M. F.

As previously stated, the resistors 11 and 12 may well be formed of manganin and the resistance of each is not varied by changes in its temperature, while the resistors 9 and 10 are formed of metal, which may well be copper, having a suitable positive temperature coefficient, so as to provide cold junction temperature compensation for the thermocouples T and T'. For that purpose, the variation in the resistance of the resistor 9, as the ambient temperature changes, should be such as to produce a variation in the potential drop in that resistor equal to the variation of the voltage in the thermocouple T resulting from the same change in the cold junction temperature of the thermocouple T when the latter is connected in the measuring circuit. Similarly, when the thermocouple T' is connected in the measuring circuit, the effect on the voltage of that thermocouple of a variation in its cold junction temperature, should be neutralized by the variation in the aggregate potential drop in the resistors 9, 10 and 11 produced by a variation in the temperature of the resistors 9 and 10 similar to the change in the cold junction temperatures of the thermocouple T'. The resistances 9, 10 and 11 may, and should be, quite small in comparison with the resistance of the resistor 12. In consequence, the effect of small changes in the resistance of the resistors 9 and 10, resulting from changes in their temperature, on the potential drop through the resistor 12, is too small to be of significance in the standardization or recalibration operation.

The principles of my invention may be embodied in circuit arrangements differing from that shown in Fig. 1, and one of which is shown, by way of example, in Fig. 2. The arrangement shown in Fig. 2 comprises a bridge circuit or split potentiometer differing from the corresponding portion of the circuit network shown in Fig. 1, in that the resistor 5 of Fig. 1 is replaced in Fig. 2 by a resistor 5' formed of metal having a temperature coefficient. The resistor 5' is preferably located in close proximity to the resistors 9 and 10, so as to be subjected to the same temperature. The resistor 5' is so proportioned that the temperature changes to which the resistors 5', 9 and 10 are subjected will not vary the ratio of the potential drops in the bridge circuit branch including resistor 5', and in the bridge circuit branch including the resistors 9 and 10. As shown, the arrangements shown in Figs. 1 and 2 also differ in form in that in Fig. 2 the resistors 7 and 8 of Fig. 1 are omitted and the terminals of the slidewire resistance 6 are connected directly to the terminals of the resistance 4.

To facilitate the ready conversion of the apparatus shown in Fig. 2 into its different range measuring conditions and its calibrating condition, I have provided a novel combination of switches SA, SB, SC and SD. The switch SA is a single pole, two position, range changing switch comprising a pivoted switch blade or movable contact adjustable between a left hand position in which it engages a stationary switch contact connected by a conductor 45 to the junction of the resistance sections 9 and 10, and a right hand position in which it engages a stationary switch contact connected by a conductor 46 to the junction of the resistance sections 11 and 12.

Each of the switches SB and SC is a single pole, two position switch, and may be called a calibrating switch because it is employed to convert the apparatus from its measuring condition into its calibrating position and then back into its measuring condition at the beginning and end of each calibrating operation. The pivoted switch blade or movable contact of the switch SB is adjustable between left and right hand positions. In its left hand position, which is its measuring position, it connects one terminal of a galvanometer 47 to a stationary switch contact which is connected to the movable contact of the switch SA. In its right hand or calibration position, the movable contact of switch SB engages a stationary switch contact which is connected to the lower end of the conductor 46. The pivoted switch blade or movable contact of the switch SC is adjustable between a left hand measuring position and a right hand calibration position. In its left hand or measuring position, the movable contact of the switch SC engages a stationary switch contact connected by a conductor 48 to a contact 50 of the switch SD. In its right hand or calibrating position, the movable contact of switch SC engages a stationary switch contact connected by conductor 49 to the positive terminal of a standard cell Sc. The negative terminal of said cell is connected through resistance 59 to the negative terminal of resistance section 12 of the bridge circuit.

The switch SD is a commutating or selector switch shown diagrammatically as of conventional form comprising two side by side stationary contacts 50 and 51, two movable contacts 50' and 51', a pair of contacts 53 and 55 alongside the contact 50 and displaced longitudinally of the latter from one another, and a pair of contacts 54 and 56 alongside the contact 51 and displaced longitudinally of the latter from one another. The contact 51 is connected by a conductor 52 to the slider contact 29' which engages the slidewire resistance 6. The terminals of one thermocouple $t$ are connected to the switch contacts 53 and 54, and the terminals of a second thermocouple $t'$ are connected to the switch contacts 55 and 56. The two thermocouples $t$ and $t'$ have different cold junction compensation requirements.

As diagrammatically shown, a mechanical connection SE between the movable contact of the range switch SA and movable contacts 50' and 51', adjusts the latter into positions in which they connect the contacts 53 and 54 to the contacts 50 and 51, respectively, of the commutating switch SD when the movable contact of the switch SA is in its right hand position and is connected by conductor 46 to the junction of the resistance sections 11 and 12. When the movable contact of the switch SA is moved into its left hand position in which it is connected by the conductor 45 to the junction of the resistance sections 9 and 10, the connection SE adjusts the contacts 50' and 51' into positions in which they connect the contacts 55 and 56 to the contacts 50 and 51, respectively, of the selector switch SD.

When the apparatus shown in Fig. 2 is in its measuring condition, the switch SB connects one terminal of the galvanometer 47 to the movable contact of the range switch SA and the switch SC connects the second terminal of the galvanometer 47 through the conductor 48 to the contact 50 of the commutator switch SD, and the adjustment of the range switch SA from one to the other of its two operative positions produces the following results. Namely, it connects one of the thermocouples $t$ and $t'$ to, and disconnects the other from the measuring circuit, it effects a predetermined scale suppression difference between the measurements of the two thermocouples, and it modifies the cold junction temperature compensation effect. The latter is provided jointly by the two temperature responsive resistance sections 9 and 10, or by the section 9 only, accordingly as the switch SA is in its right, or left hand position.

When necessary, the effective voltage spans of the two thermocouples $t$ and $t'$ may be adjusted so that when the voltages of the two thermocouples are measured with a suitable scale suppression difference, the measurements of one voltage may be recorded on one, and the measurements of the other voltage may be recorded on the other, of the two side by side half portions of the record chart of a potentiometric measuring instrument of suitable sensitivity. Thus, for example, when the thermocouple $t$ is a precious metal, or QR thermocouple having one conductor formed of pure platinum and the other formed of 87 percent platinum and 13 percent rhodium, and is used to measure temperatures varying between 2000° F. and 3000° F., and the thermocouple $t'$ is an iron constantan, or IC thermocouple employed to measure temperatures which vary between 200° F. and 1400° F., the voltages of the two thermocouples may well be measured and recorded by a recording potentiometer adapted when use is made of its full scale range, to measure the voltages of the QR thermocouple corresponding to temperatures of that thermocouple varying from 1000° F. to 3000° F. In such case, the output voltage span of the thermocouple $t'$ should be so reduced that when the temperature of the IC thermocouple $t'$ is increased from 200° F. to 1400° F., the increase in the voltage of the thermocouple $t'$ will be equal in magnitude to the increase in the voltage of the QR thermocouple $t$, produced by increasing the temperature of that thermocouple from 1000° F. to 2000° F. Such a reduction may be effected, as shown in Fig. 2, by connecting the cold junction ends of the iron constantan parts of the thermocouple $t'$ through a suitable resistance 57, and connecting one end of the resistance 57 to the contact 56 of switch SD, and connecting a suitable intermediate point of the resistance 57 to the contact 55 of the selector switch SD through a tap 58. With the tap 58 connected to the resistance 57 at a suitable point, and with the resistors 9, 10, 11 and 12 suitably proportioned, the effective voltage spans of the thermocouples $t$ and $t'$ will be so relatively proportioned that the voltages of the thermocouples $t'$ and $t$ when subjected to temperatures in the ranges 200° F.–1400° F. and 2000° F.–3000° F., respectively, may be recorded on the left and right hand halves, respectively, of the chart of the last mentioned recording potentiometer.

Merely by way of illustration and example, and not by way of limitation, it is noted that in one embodiment of the invention including a split potentiometer circuit of the form shown herein, the resistors 9 and 10 are formed of copper and at 70° F. have resistances of 5.255 ohms and 1.654 ohms, respectively, and the resistance elements 11 and 12 are formed of manganin and have resistances of 7.844 ohms and 509.5 ohms, respectively.

While, in accordance with the provisions of the statutes, I have illustrated and described the best forms of embodiment of my invention now known to me, it will be apparent to those skilled in the art that changes may be made in the forms of the apparatus disclosed without departing from the spirit of my invention as set forth in the appended claims, and that in some cases certain features of my invention may be used to advanage without a corresponding use of other features.

Having now described my invention, what I claim as new and desire to secure by Letters Patent, is:

1. A potentiometer measuring circuit for measuring the voltages of two thermocouples differing in their cold junction temperature compensation requirements with a scale suppression difference between the measurements, said circuit including a slide wire resistance and a resistance section including in series a resistor having a resistance which varies with its temperature, resistance material varying in resistance with its temperature, and a resistance element, the resistance of which does not vary with its temperature and which is large in comparison with the sum of the resistance of said resistor and resistance material, means comprising a source of current and an adjustable resistance included in said circuit for creating and regulating current flow through said slidewire resistance and resistance section, a contact adjustable along said slidewire resistance, a current responsive device, and means for connecting said thermocouples one at a time in series with said device between said contact and said resistance section, one of said thermocouples being connectable to said section at one end, and the other of said thermocouples being connectable to said section at the other end of said resistance material, the variations in resistance of said resistor and resistance material due to ambient temperature changes being so related to the changes in the voltages of said thermocouples produced by their respective cold junction changes resulting from said ambient temperature changes as to compensate for variations in the cold junction temperature of each thermocouple when that thermocouple is connected in said measuring circuit and circuit calibrating means comprising a standard cell and switch means for operatively connecting said device and said cell in series with one another between the terminals of said resistance element.

2. A potentiometric measuring circuit for measuring the voltages of two thermocouples differing in their cold junction temperature compensation requirements with a scale suppression difference between the measurements, said circuit including a slidewire resistance and a resistance section including in series a resistor having a resistance which varies with its temperature, resistance material varying in resistance with its temperature, and a resistance element, the resistance of which does not vary with its temperature and which is large in comparison with the sum of the resistance of said resistor and resistance material, means comprising a source of current included in said circuit for creating a current flow through said slidewire resistance and resistance section, a contact adjustable along said slidewire resistance, a current responsive device, three single pole switches each having a pair of relatively stationary contacts adapted to be selectively engaged by an associated movable contacting member, a connection from one terminal of said resistance material to one of the contacts of one of said switches, a connection from the other terminal of said resistance material to the other contact of said one switch, a connection from said other contact of said one switch to one of the contacts of a second one of said switches, a connection from the movable contact member of said one switch to the other contact of said second switch, a connection from the movable contact member of said second switch to one terminal of said current responsive device, a connection from the second terminal of said current responsive device to the movable contact member of the third of said switches, means operated in synchronism with the movable contact member of said one switch to connect said thermocouples one at a time to one of the contacts of said third switch, the variations in resistance of said resistor and resistance material due to ambient temperature changes being so related to the changes in the voltages of said thermocouples produced by their respective cold junction temperature changes resulting from said ambient temperature changes as to compensate for variations in the cold junction temperature of each thermocouple when that thermocouple is connected in said measuring circuit and a standard cell connected between the other contact of said third switch and the terminal of said resistance element remote from said resistance material.

3. A potentiometric measuring circuit for measuring the voltages of two thermocouples differing so that similar variations in their cold junction temperatures produce a greater difference in the voltage of one thermocouple than in the voltage of the second thermocouple with scale suppression and cold junction temperature compensation differences between the measurements, said circuit comprising an energizing branch including a source of current, a second branch including a slide wire resistance and a third branch including first, second and third resistance elements, said elements being connected in series with one another with said second element intermediate said first and third elements, each of said second and third circuit branches being connected in parallel with the other and in series with said energizing branch, a contact adjustable along said slide wire resistance, a current responsive device, means including a switch for successively connecting said thermocouples one at a time with said device in series therewith between said contact and said third circuit branch at one end or the other of said second resistance element depending upon the adjustment of said switch, said first and second resistance elements varying in resistance in response to ambient temperature changes in amounts so related to the variations in voltages of the two thermocouples resulting from variations in their respective cold junction temperature, due to the said ambient temperature changes, as to compensate for the effect of said ambient temperature on the voltage of each of said thermocouples when connected in said measuring circuit, the resistance of said third resistance element being substantially unaffected by ambient temperature changes and being large in comparison with the sum of the resistances of said first and second resistance elements, and circuit calibrating means comprising a standard cell and switch means for operatively connecting said device and said cell in series with one another between the terminals of said third resistance element.

CHARLES A. VOGELSANG.

REFERENCES CITED

The following references are of record in the file of this patent:

UNITED STATES PATENTS

| Number | Name | Date |
|---|---|---|
| 1,443,553 | Allcutt | Jan. 30, 1923 |
| 1,982,053 | Hodgson et al. | Nov. 27, 1934 |
| 2,344,116 | Ullman | Mar. 14, 1944 |
| 2,364,923 | Smith | Dec. 12, 1944 |